(12) United States Patent
Edwards et al.

(10) Patent No.: US 7,196,654 B2
(45) Date of Patent: Mar. 27, 2007

(54) VEHICLE POSITIONING AND TRACKING RADAR SYSTEM

(75) Inventors: David John Edwards, Oxfordshire (GB); Dominic Robert Pearce, Nottingham (GB); Jan Grothusen, Leicester (GB)

(73) Assignee: Guidance Navigation Limited, Leicester (GB)

( * ) Notice: Subject to any disclaimer, the term of this patent is extended or adjusted under 35 U.S.C. 154(b) by 287 days.

(21) Appl. No.: 10/898,705

(22) Filed: Jul. 23, 2004

(65) Prior Publication Data

US 2005/0062640 A1 Mar. 24, 2005

(30) Foreign Application Priority Data

Jul. 26, 2003 (GB) .................................. 0317501.5

(51) Int. Cl.
*G01S 13/74* (2006.01)
*G01S 13/75* (2006.01)
*G01S 13/00* (2006.01)

(52) U.S. Cl. ........................... 342/43; 342/41; 342/42; 342/51; 342/104; 342/107; 342/109; 342/113; 342/118; 342/125; 342/128; 342/146; 342/147; 342/175; 342/188; 342/361

(58) Field of Classification Search ............ 342/27–51, 342/70–72, 104–113, 118, 128–133, 145–147, 342/175, 188–197, 361–366, 125
See application file for complete search history.

(56) References Cited

U.S. PATENT DOCUMENTS 2,939,132 A * 5/1960 Tollefson .................... 342/104
2,939,135 A * 5/1960 Beckerich et al. ............ 342/29
3,714,651 A * 1/1973 Lyon ............................ 342/29
3,781,879 A 12/1973 Staras et al.
4,983,976 A * 1/1991 Ogata et al. .................. 342/42
5,021,790 A * 6/1991 Ohta et al. .................... 342/44
5,081,458 A * 1/1992 Meunier ....................... 342/44
5,258,762 A * 11/1993 Cabon et al. ................. 342/42
5,349,356 A * 9/1994 Camiade et al. .............. 342/50
5,774,045 A 6/1998 Helma et al.
5,955,971 A * 9/1999 Uemura ....................... 342/35
6,246,356 B1 * 6/2001 Gunnarsson ................. 342/51
6,611,224 B1 * 8/2003 Nysen et al. ................. 342/42

FOREIGN PATENT DOCUMENTS

DE 40 28 603 A1 3/1992
DE 197 31 085 A1 1/1999
GB 813019 A 5/1959
JP 7 027854 A 1/1995

* cited by examiner

*Primary Examiner*—Bernarr E. Gregory
(74) *Attorney, Agent, or Firm*—Husch & Eppenberger, LLC; Rebecca J. Brandau

(57) ABSTRACT

A vehicle positioning and tracking radar system includes a rotating antenna with a pair of spatially separated transmit feeds for simultaneously transmitting a pair of frequency-modulated continuous-wave (FMCW) electromagnetic signals having a first polarisation and a pair of spatially separated receive feeds for receiving an electromagnetic signal having a second polarisation, wherein the first and second polarisations are different from one another, such that the transmit feed and receive feed at the rotating antenna are isolated from each other; and a coded modulated transponder receives transmit signals from the rotating antenna with the first polarization and transmits a receive signal to the rotating antenna with the second polarization.

13 Claims, 1 Drawing Sheet

VEHICLE POSITIONING AND TRACKING RADAR SYSTEM

CROSS-REFERENCE TO RELATED APPLICATIONS

This application claims the benefit of pending British Patent Application No.0317501.5 filed Jul. 26, 2003.

STATEMENT REGARDING FEDERALLY SPONSORED RESEARCH OR DEVELOPMENT

Not Applicable.

APPENDIX

Not Applicable.

FIELD OF THE INVENTION

The present invention provides a rotating antenna for simultaneously transmitting a pair of frequency-modulated continuous-wave (FMCW) electromagnetic signals having a first polarisation and for receiving an electromagnetic signal having a second polarisation, wherein the first and second polarisations are different such that the transmit and receive feeds at the antenna are isolated from each other.

BACKGROUND AND SUMMARY OF THE INVENTION

Throughout this specification, the terms "transmit signals" and "receive signal" refer to signals that are transmitted from, and received by, the antenna.

The rotating antenna is suitable for use as part of a vehicle positioning and tracking radar system in combination with a coded modulated transponder which returns or transmits a receive signal to the antenna having a different polarisation to the transmit signals. The term "coded modulated transponder" refers to any transponder which can superimpose a temporal code on the incident transmit signals using a chosen modulation scheme. The chosen modulation scheme can be based on amplitude or phase modulation, for example.

The transponder is preferably passive in the sense that it does not require frequent battery changes. The transponder is also preferably retro-reflective so that the incident transmit signals are directed back towards the antenna for a broad range of incidence angles. However, it will be appreciated that the transponder can also be active in which case it will require a permanent power source. A suitable transponder is a retro-reflective array transponder described in WO 00/59068 (Isis Innovation Limited) adapted so that it alters the polarisation of the transmit signals.

The radar system is particularly suitable for tracking the position of marine vessels or land vehicles that operate on a fixed plane. The antenna can be mounted on the marine vessel and the transponder can be positioned on a fixed platform such as a harbour wall, drilling rig or buoy, for example. As the marine vessel approaches the fixed platform, the antenna will illuminate the transponder and the radar system can use the receive signal to determine the range, bearing and velocity of the marine vessel relative to the transponder. The radar system can provide information for the manual or automatic control of the marine vessel so that it can be held a predetermined distance from the fixed platform. If the radar system includes a second coded modulated transponder (see below) then the marine vessel can also be held at a predetermined orientation relative to the fixed platform.

It will be readily appreciated that the radar system can be used in other ways. For example, the transponder can be mounted on a marine vessel or a land vehicle and the location of the rotating antenna can be fixed. As long as the marine vessel or land vehicle is within the predetermined area that is illuminated by the rotating antenna, the radar system can use the receive signal from the transponder to determine the range, bearing and velocity of the marine vessel or land vehicle relative to the antenna. The position of marine vessel or the land vehicle can then be noted at regular intervals so that its movement within the predetermined area can be tracked.

The transmit signals are preferably vertically polarised and the receive signal is preferably horizontally polarised, or vice versa. The cross-polarisation of the transmit signals and the receive signal prevents power leakage between the transmit and receive feeds at the antenna which would otherwise be significant in an FMCW radar system.

The radar system is preferably capable of simultaneously processing the receive signal from two or more transponders. The radar system can therefore include a second coded modulated transponder. Further coded modulated transponders can be added depending on the operational requirements of the radar system. The transponders preferably operate at different modulation frequencies and superimpose different temporal codes on the incident transmit signals so that the radar system can easily distinguish between the receive signal from one transponder and the receive signal from another transponder.

The capacity to distinguish different temporal codes from transponders co-located at the same azimuthal position also helps the radar system to discriminate the receive signal from the background clutter and multi-path reflections while still taking accurate bearing measurements to each transponder. Monopulse is a standard radar technique applied to servoed antenna signals that enables the signal processing to lock on to a target during operation. Applying monopulse techniques to a rotating antenna has been found to give an improvement in the amount of information that can be obtained in a single scan and allows the radar system to obtain a better bearing estimate. However, monopulse techniques do not work well if two targets are close together. Because the radar system of the present invention provides separate signals from each transponder, this limitation is removed and monopulse techniques can still be used to accurately determine a bearing estimate to each transponder on a "per sample" basis whether they are co-located or not, whilst still enabling the temporal coding to reduce the risk that background clutter will seriously degrade the achievable angular resolution.

An optical encoder can be used to determine the angular position of the antenna.

DETAILED DESCRIPTION

Figure 1:
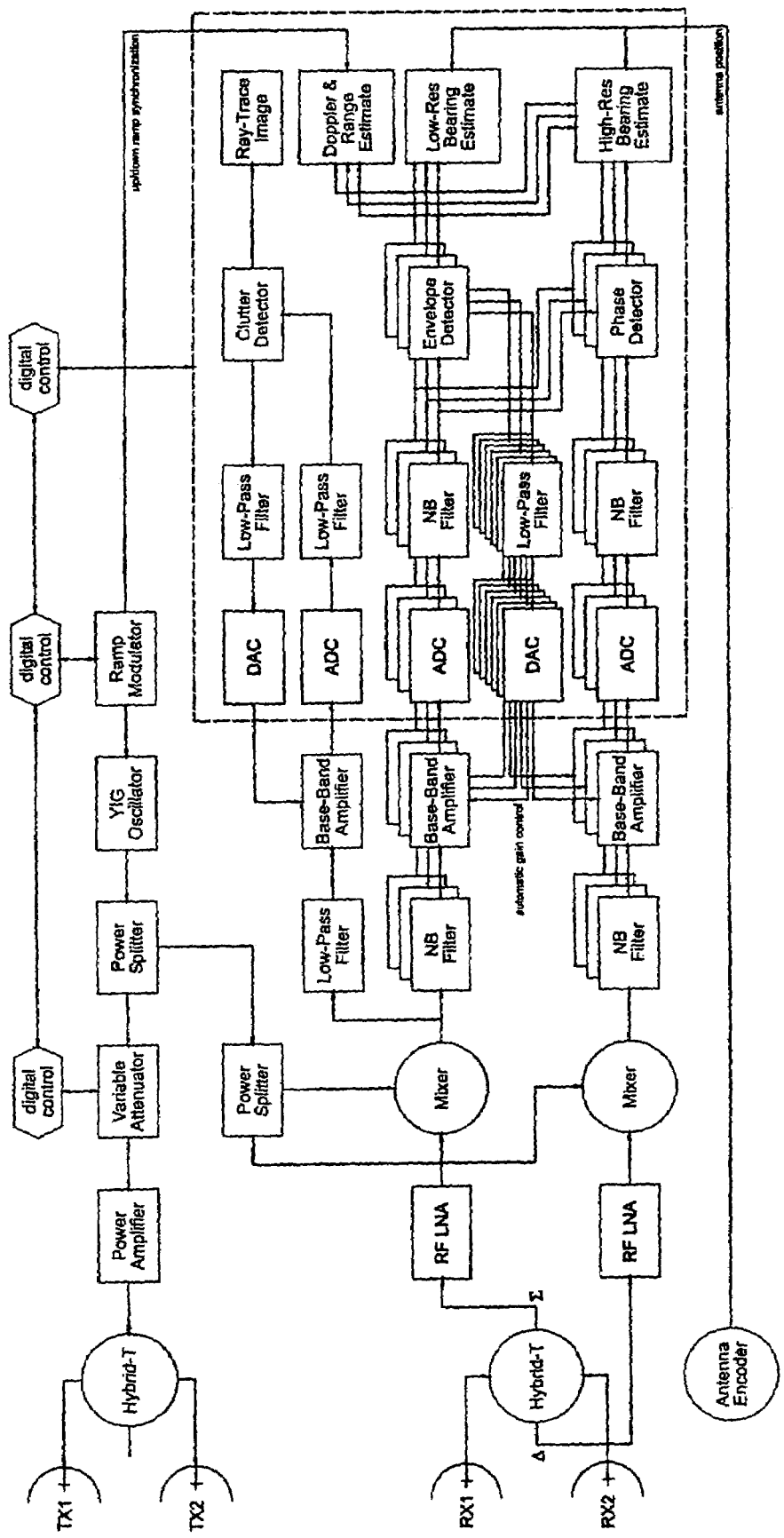
FIG. 1 is a schematic drawing of a radar system according to the present invention.

With reference to FIG. 1, the radar system includes a rotating antenna (not shown) that simultaneously transmits a pair of vertically polarised frequency-modulated continuous-wave (FMCW) signals. A YIG oscillator provides a 9.2–9.3 GHz (X-band) signal which is modulated by a DAC ramp modulator and fed through a power splitter, a variable attenuator and a 35 dB power amplifier to a hybrid T where it is divided to create two transmit feeds TX1 and TX2.

The transmit signals are incident on three retro-reflective transponders (not shown). The transponders cannot distinguish between one transmit signal and the other and they simply reflect the sum total of the incident energy back towards the rotating antenna with horizontal polarisation. Each transponder superimposes a unique temporal code on the reflected signal at a particular modulation frequency. The reflected signal is received at the rotating antenna by two spatially separated receive feeds RX1 and RX2. The transmit feeds TX1 and TX2 and the receive feeds RX1 and RX2 are isolated from each other because they are cross-polar.

The two receive feeds RX1 and RX2 are combined in a hybrid T that provides a sum output (labelled "Σ") and a difference output (labelled "Δ"). The sum output and the difference output are fed into separate mixers where they are mixed with the transmit feed from the power splitter. The mixed signals are filtered using narrowband ("NB") 0.5 MHz filters to remove background clutter and to separate out the signals returned by each of the transponders, amplified using base-band amplifiers and fed into a processing system represented by the dotted box. The narrowband filters are specifically chosen to match the transponder modulation frequencies.

The mixed signal from the sum output is also filtered using a low-pass filter to isolate the background clutter and amplified using a base-band amplifier. The processing system uses this signal to produce a 360° trace image.

The filtering and amplification is carried out separately for each of the reflected signals (i.e. for each transponder modulation frequency) as represented schematically by the three-layered boxes. The filtering and amplification can be hardware or software based depending on the degree of flexibility that is required.

In the processing system, the three pairs of sum and difference outputs are filtered using narrowband ("NB") 0.5 MHz filters chosen specifically to match the transponder modulation frequencies and then used to determine a range and bearing estimate. The processing is carried out using an envelope detector and a phase sensitive detector, both of which use information about the angular position of the antenna developed by an optical encoder. The DAC ramp modulator produces a saw-tooth analogue ramp signal and this is used to derive a digital direction signal that indicates if the ramp is going up or down. The digital direction signal is then fed into the processing system where it is used by the system to determine the velocity of the antenna relative to each of the transponders using Doppler techniques.

The antenna is mounted on a marine vessel inside a low-loss radome (not shown) and rotates about a vertical axis sweeping out a plane nominally parallel to the sea and illuminating the three pre-surveyed coded transponders provided on the side of a drilling rig. The radar system determines the range, bearing and velocity of the rotating antenna relative to each transponder and this information can be used to manually or automatically control the marine vessel so that it is held a predetermined distance from, and at a predetermined orientation to, the drilling rig to avoid the risk of collision. The 360° trace image provides useful information about the structure of the drilling rig and can be combined with the range, bearing and velocity information to show the position of each of the retro-reflective transponders relative to the surrounding environment.

The radar system has a minimum and maximum range capability of about 20 m and about 2000 m respectively. Range and bearing resolution of about 0.1 m and 0.05 mrad can be achieved.

What is claimed is:

1. A vehicle positioning and tracking radar system comprising a rotating antenna having a pair of spatially separated transmit feeds for simultaneously transmitting a pair of frequency-modulated continuous-wave (FMCW) electromagnetic signals having a first polarisation and a pair of spatially separated receive feeds for receiving an electromagnetic signal having a second polarisation, wherein the first polarisation and the second polarisation are different from one another, such that the transmit feed and receive feed at the rotating antenna are isolated from each other; and
   a coded modulated transponder;
   wherein the transponder receives the transmit signals from the rotating antenna with the first polarisation and transmits a receive signal to the rotating antenna with the second polarisation.

2. A vehicle positioning and tracking radar system according to claim 1, wherein the transmit signals are vertically polarised and the receive signal is horizontally polarised.

3. A vehicle positioning and tracking radar system according to claim 1, wherein the transmit signals are horizontally polarised and the receive signal is vertically polarised.

4. A vehicle positioning and tracking radar system according to claim 1, wherein the rotating antenna further comprising an optical encoder for determining the angular position of the rotating antenna.

5. A vehicle positioning and tracking radar system according to claim 1, wherein the transponder is passive.

6. A vehicle positioning and tracking radar system according to claim 1, wherein the transponder is retro-reflective.

7. A vehicle positioning and tracking radar system according to claim 1, wherein the transponder is active.

8. A vehicle positioning and tracking radar system according to claim 1, wherein the receive signal is used to determine a parameter selected from the group consisting of the range, bearing and velocity of the rotating antenna relative to the transponder.

9. A vehicle positioning and tracking radar system according to claim 1, wherein the rotating antenna is mounted on a vehicle and the transponder is mounted on a fixed platform.

10. A vehicle positioning and tracking radar system according to claim 1, wherein the position of the rotating antenna is fixed and the transponder is mounted on a vehicle.

11. A vehicle positioning and tracking radar system according to claim 10, wherein the first transponder and the second transponder operate at different modulation frequencies.

12. A vehicle positioning and tracking radar system according to claim 10, wherein the first transponder and the second transponder have different codes.

13. A vehicle positioning and tracking radar system according to claim 1, further comprising a second coded modulated transponder, wherein the second transponder receives transmit signals from the rotating antenna with the first polarisation and transmits a receive signal to the rotating antenna with the second polarisation.

* * * * *